United States Patent
Janardhanan (10) Patent No.: US 9,614,759 B2
(45) Date of Patent: Apr. 4, 2017

(54) SYSTEMS AND METHODS FOR PROVIDING ANYCAST MAC ADDRESSING IN AN INFORMATION HANDLING SYSTEM

(75) Inventor: Pathangi Narasimhan Janardhanan, Chennai (IN)

(73) Assignee: Dell Products L.P., Round Rock, TX (US)

( * ) Notice: Subject to any disclaimer, the term of this patent is extended or adjusted under 35 U.S.C. 154(b) by 760 days.

(21) Appl. No.: 13/560,885

(22) Filed: Jul. 27, 2012

(65) Prior Publication Data

US 2014/0029412 A1   Jan. 30, 2014

(51) Int. Cl.
*H04L 12/58* (2006.01)
*H04L 12/721* (2013.01)

(52) U.S. Cl.
CPC .......... *H04L 45/66* (2013.01); *H04L 2212/00* (2013.01)

(58) Field of Classification Search
CPC ............. H04L 12/4625; H04L 12/4641; H04L 12/4675; H04L 12/4679; H04L 45/245; H04L 45/583; H04L 45/586; H04L 49/70
See application file for complete search history.

(56) References Cited

U.S. PATENT DOCUMENTS

| | | | |
|---|---|---|---|
| 9,092,274 B2* | 7/2015 | Cardona | G06F 9/45558 |
| 2005/0201302 A1* | 9/2005 | Gaddis et al. | 370/254 |
| 2008/0186968 A1* | 8/2008 | Farinacci et al. | 370/392 |
| 2010/0226381 A1* | 9/2010 | Mehta et al. | 370/401 |
| 2010/0246388 A1* | 9/2010 | Gupta | H04L 12/4625 370/225 |
| 2011/0116509 A1* | 5/2011 | Moreno | H04L 12/4625 370/401 |
| 2011/0235523 A1* | 9/2011 | Jha et al. | 370/242 |
| 2011/0299402 A1* | 12/2011 | Vobbilisetty et al. | 370/241 |
| 2012/0177041 A1* | 7/2012 | Berman | 370/392 |
| 2012/0281700 A1* | 11/2012 | Koganti et al. | 370/392 |
| 2013/0003747 A1* | 1/2013 | Raman et al. | 370/401 |

* cited by examiner

*Primary Examiner* — Man Phan
*Assistant Examiner* — Ryan Kavleski
(74) *Attorney, Agent, or Firm* — Haynes and Boone, LLP (57) ABSTRACT

An information handling system is provided. The information handling system includes systems and methods for providing an anycast MAC addressing capability to a network. The anycast MAC address may be provided by creating and using virtual routing bridges, which in the network topology appear in front of service-providing nodes associated with the anycast MAC address. The physical routing bridges that neighbor the virtual routing bridge in the network are configured so as to provide the routing bridge functions to the virtual routing bridge, including propagating network topology information representing the virtual routing bridge to the rest of the network.

19 Claims, 5 Drawing Sheets

SYSTEMS AND METHODS FOR PROVIDING ANYCAST MAC ADDRESSING IN AN INFORMATION HANDLING SYSTEM

BACKGROUND

1. Technical Field

The present disclosure is related to information handling systems. In particular, embodiments disclosed herein are related to providing services identified by a MAC address in a TRILL network.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Certain information handling systems, such as TRILL (transparent interconnect of lots of links) networks provide unique benefits over other network implementations. However, providing services that are normally identified by the MAC addresses of a node providing a service which is reachable from multiple nodes is not straightforward. Therefore, what is needed is a system and method for providing such capability.

SUMMARY

Consistent with some embodiments, there is provided an information handling system. The information handling system may include a first physical bridging devices and a virtual bridging device, the virtual bridging device being provided by the first physical bridging device. The first physical bridging device may be configured to create a link state packet indicating that the first physical bridging device and the virtual bridging device are neighbors and to transmit the link state packet. A specific MAC address can be configured to be associated with the virtual bridging device. The first physical bridging device may be further configured to recognize the specific MAC address in the data packets and encapsulate data packets using the identifier of the virtual bridging device in a header of the encapsulated data packets. The information handling system may also decapsulate data packets that include the virtual bridging device in the header and send the decapsulated packet to a local port.

Consistent with some embodiments, there is further provided a method for creating an anycast MAC address in an information handling system. The method may include providing a linked plurality of physical bridging devices, a subset of which may be in communication with one or more nodes providing a service associated with a source MAC address. The method may also include determining that a virtual bridging device associated with the source MAC address is associated with the subset, receiving a packet with the source MAC address from the one or more nodes at one of the subset, and encapsulating the packet with the source MAC address received by the subset with an identifier of the virtual RBridge as an ingress bridging device address in a header of the encapsulated packet. After encapsulation, the encapsulated packet may be forwarded to another of the linked plurality of bridging devices.

Other embodiments may provide another method for creating an anycast MAC address in an information handling system. The method may include receiving, at a neighboring physical bridging device, a packet having a destination MAC address associated with a service and determining that the destination MAC address is located behind a virtual bridging device associated with the destination MAC address. The method may also include determining that the neighboring physical bridging device and the virtual bridging device are neighbors and then decapsulating the packet before forwarding it from the neighboring physical bridging device to a node associated with the destination MAC address.

These and other embodiments will be described in further detail below with respect to the following figures.

BRIEF DESCRIPTION OF THE DRAWINGS

In the drawings, elements having the same designation have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
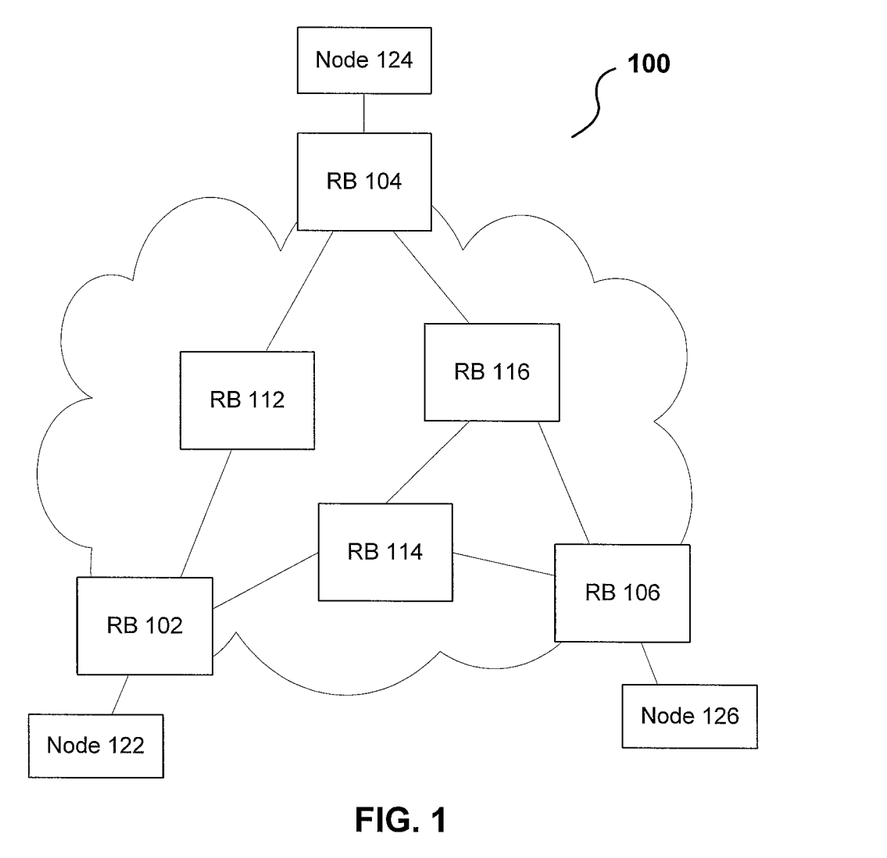
FIG. 1 depicts an information handling system using a network.

FIG. 1 shows an exemplary information handling system 100 consistent with some embodiments using a Transparent Interconnect of Lots of Links ("TRILL") type network. The TRILL protocol is a protocol defined by the Internet Engineering Task Force. Information handling system 100 (also called network 100 herein) may include a plurality of routing bridges. Routing bridges ("RBridges") are network devices that implement the TRILL protocol.

As shown in FIG. 1, exemplary network 100 is depicted as including a total of six bridging devices. In some embodiments, these bridging devices may be RBridges. Such embodiments will be presented in detail below, although other embodiments are not outside the scope of this disclosure. Network 100 may have more or fewer bridging devices than depicted. As shown in FIG. 1, network 100 includes three edge RBridges (RBridges 102, 104, and 106) that interface with nodes 122, 124, and 126, respectively, outside of the core of network 100. Nodes 122, 124, and 126 may provide services such as L3 routing, DNS, and other services. RBridges 102, 104, and 106 may also interface with core RBridges 112, 114, and 116. RBridges 112, 114, and 116 may not interface with nodes 122, 124, and 126, but interface with other core and edge RBridges.

Network 100 may communicate packets originating on the periphery of network 100 through the RBridges to a destination node also outside network 100. For example, when a packet from node 124 is to be sent to node 122, RBridge 104 may receive the packet and encapsulate it in a TRILL frame by applying a TRILL header. Such packets may include a source MAC address and a destination MAC address in an inner header. The TRILL header is applied outside the inner header and may include a hop count, an ingress RBridge address, an egress RBridge address, and other fields. All RBridges in network 100 may be configured to determine that packets that include a specific destination MAC address in the inner header may egress though a specific RBridge associated with the specific destination MAC address and the corresponding specific node. Thus RBridge 104 may encapsulate the packet received from node 124 with a TRILL header that includes RBridge 104 as the ingress RBridge address and RBridge 102 as the egress RBridge address, since the packet may egress network 100 through RBridge 102 to reach node 122. After encapsulation, RBridge 104 may forward the frame toward RBridge 102 using a routing table determined through the use of the intermediate system to intermediate system (IS-IS) routing protocol.

Returning to FIG. 1, a frame may travel multiple paths from RBridge 104 through network 100 to reach RBridge 102. At each hop from RBridge to RBridge an outer header specifying the hop source and hop destination will be removed and replaced to reflect the next hop. Network 100 may be configured to determine optimal routes from RBridge to RBridge based on proximity, load-balance, operational status, or other criteria.

Figure 2:
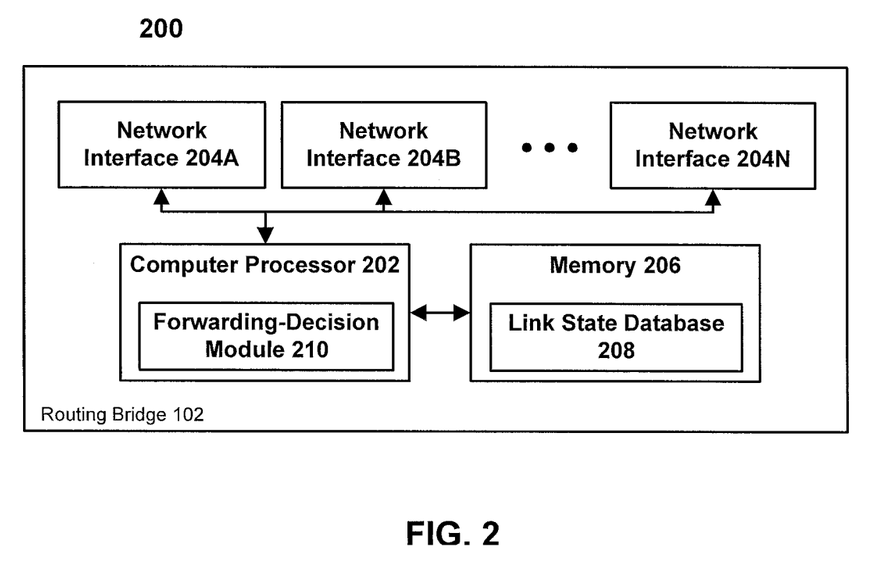
FIG. 2 depicts a functional representation of a routing bridge device such as may be used in a network.

FIG. 2 is a non-exhaustive functional description of exemplary bridging device 200. All of the bridging devices in network 100 shown in FIG. 1, including RBridges 102, 104, 106, 112, 114, and 116, may include the functional modules that bridging device 200 does. Bridging device 200 may include a computer processor 202, a plurality of network interfaces 204A-N, and a memory 206. Computer processor 202 may execute instructions stored in memory 206 to control the flow of packets through bridging device 200. In addition, computer processor 202 may provide a forwarding-decision module 208 that may examine the outer header of a received packet. The outer header may be a network-specific header, such as a TRILL header, and may indicate whether the packet is a unicast or multicast packet. When bridging device 200 receives an encapsulated packet, forwarding-decision module 208 may determine the next bridging device, or in some embodiments the next bridging device, to which to forward the packet based on the criteria mentioned above.

Forwarding-decision module 208 may be populated from link state database 210 stored in memory 206. Link state database 210 may include information providing a topology of a network 100 of which exemplary bridging device 200 may be a part. Therefore, link state database 210 may indicate the identities and locations of all bridging devices in the network. Forwarding-decision module 208 may also be populated from MAC address resolution table 212. MAC address resolution table 212 may indicate associations between MAC addresses and bridging devices, such as RBridges, in network 100. When a packet is received by an ingress RBridge, forwarding-decision module 208 may access the contents of MAC address resolution table 212 to find the egress RBridge associated with the packet's MAC destination address. After determining the egress RBridge based on a lookup of MAC address resolution table 212, forwarding-decision module 208 may then use the contents of link state database 210 to determine the next hop by which to forward the packet. MAC address resolution table 212 may also indicate a particular egress RBridge that should be used for a particular MAC address. For example, MAC address resolution table may indicate that a packet's destination MAC address of node 122 is associated with RBridge 102, the packet's egress RBridge. Then, link state database 210 may indicate to which RBridge to forward the packet as it progresses to RBridge 102.

After forwarding-decision module 208 determines to whichever RBridge a received packet should be forwarded, computer processor 202 may direct the forwarding of the encapsulated packet through the appropriate one of network interfaces 204A-N. Under certain circumstance, forwarding-decision module 208 may determine that a packet should be forwarded to more than one RBridge. This may be the case when forwarding-decision module 208 determines that a received packet is a multi-destination packet or where the destination is not known. In such a case, computer processor 202 will forward the packet to the appropriate more than one of network interfaces 204A-N. In the example above, the MAC address solution table 212 and link state database 210 may be implemented in a variety of software and hardware configurations.

Bridging device 200 may include other functional modules not depicted. For example, bridging device 200 may include an encapsulation module, a decapsulation module, link-state-packet creation and reception modules, a link state database formation module, a MAC address resolution formation module, and other modules. As mentioned, in some embodiments, bridging device 200 may be an RBridge. In such embodiments, bridging device 200 may be referred to as RBridge 200.

By using the functional modules as discussed above, bridging device 200 and computer processor 202 thereof may be used to provide a virtual bridging device. If bridging device 200 receives a packet that includes a virtual bridging device identifier as the egress bridging device address and link state database 210 indicates that bridging device 200 neighbors the virtual bridging device in the network topology, computer processor 202 and the other components of bridging device 200 may function on behalf of the virtual bridging device. Thus, computer processor 202 may recognize when it receives a packet intended for a node behind the virtual bridging by detecting an identifier of the virtual bridging device in the packet's header. Computer processor 202 may decapsulate the packet and determine its destination MAC address using MAC address resolution table 212. Forwarding-decision module 208 may then determine over which of network interfaces 204A-N the decapsulated packet should be sent. The packet may then be sent to the appropriate node by the determined network interface. In a topology of the network this node may appear accessible only through the virtual bridging device, rather than through the physical bridging device 200 to which the node is actually connected.

Figure 3:
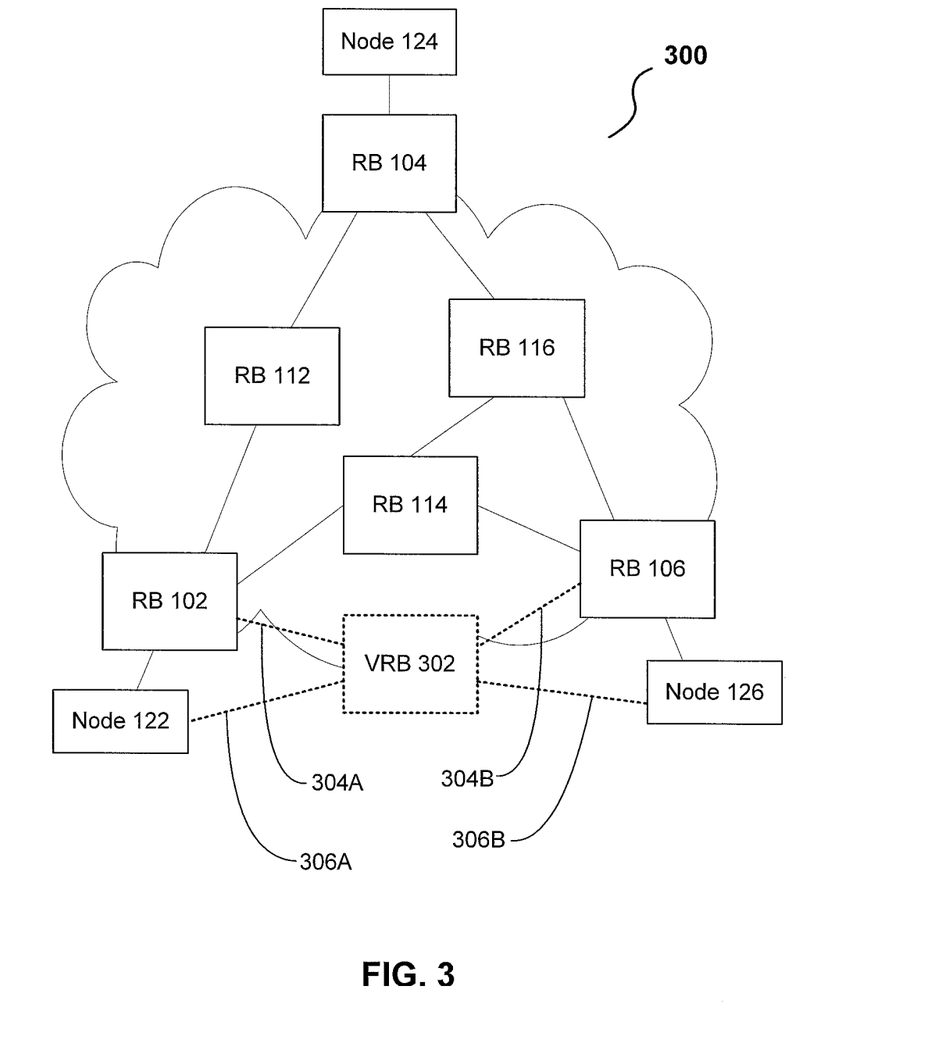
FIG. 3 depicts an information handling system using a network incorporating a virtual routing bridge to provide an anycast MAC addressing mechanism.

FIG. 3 depicts an information handling system, network 300, that provides an anycast MAC address by providing a virtual bridging device. In addition to the features of FIG. 1, the information handling system of FIG. 3 includes a virtual bridging device, virtual RBridge 302. Virtual RBridge 302 may be provided by one or more RBridges such as RBridge 102 and/or RBridge 106.

For example, RBridge 102 may provide virtual RBridge 302 as described below. Virtual RBridge 302 may have virtual connections 304A and 306A. Virtual connection 304A may virtually connect RBridge 102 to virtual RBridge 302, and virtual connection 306A may virtually couple virtual RBridge 302 to node 122.

RBridge 102 may be configured, manually or automatically, to associate a specific MAC address of node 122 with a virtual bridging device identifier representing virtual RBridge 302. RBridge 102 may include this virtual RBridge identifier in its link state database, such as link state database 210 of FIG. 2. Further the link state database of RBridge 102 may indicate that RBridge 102 and virtual RBridge 302 are neighbors. The computer processor of RBridge 102 may create a link state packet that reflects the connection of virtual RBridge 302 and the specific MAC address and that RBridge 102 and virtual RBridge 302 are neighbors. RBridge 102 may transmit this link state packet throughout the network. Upon receipt, all other RBridges in the network may update their respective link state databases to indicate the connection and the neighbor status.

Additionally, RBridge 102 may provide for the association of the virtual RBridge 102 and the specific MAC address. When a data packet is sent out from RBridge 102 with an identifier of virtual RBridge 302 as the packet's ingress RBridge in its header, the packet may also be sent with its inner source MAC address as the specific MAC address. This may allow the other RBridges in the network to associate the specific MAC address with virtual RBridge 302, to create a MAC-RBridge binding in their MAC address resolution tables, shown as MAC address resolution table 212 in FIG. 2. By ensuring the link state databases and the MAC address resolution tables on all the RBridges in the network contain this information, the network may behave as if the service associated with the specific MAC address is located behind virtual RBridge 302. Thereby, the specific MAC address may be an anycast MAC address.

For example, RBridge 102 may receive a packet from node 122 which includes a destination MAC address of node 124. If the received packet contains the specific MAC address of node 122 as its source address, RBridge 102 will recognize, by configuration, that the specific MAC address is associated with virtual RBridge 302. When RBridge 102 encapsulates the packet into a TRILL frame, RBridge 102 may use the virtual RBridge identifier as the ingress RBridge address and RBridge 104 as the egress RBridge address in the TRILL header. RBridge 102 will then forward the frame through the network 100. When the frame reaches RBridge 104, RBridge 104 determines from the header that it is the egress RBridge for the frame and that virtual RBridge 302 was the frame's ingress RBridge. RBridge 104 may then decapsulate the packet from the frame and forward the packet to node 124 and may also learn that the MAC address is now reachable through virtual RBridge 302.

As another example, RBridge 104 may receive a packet from node 124 that includes the specific MAC address as the destination address of the packet. RBridge 104's forwarding-decision module may consult its MAC address solution table and thereby determine that the specific MAC address is associated with virtual RBridge 302. RBridge 104 may then encapsulated the received packet into a TRILL frame, including RBridge 104 as the ingress RBridge address and using the virtual RBridge identifier as the egress RBridge address. RBridge 104 may then forward the encapsulated frame toward virtual RBridge 302. In the topology of the network contained in the link state databases of all RBridges in the network, RBridge 102 may be listed as the only neighbor of virtual RBridge 302. If that is the case, as the encapsulated frame is forwarded to virtual RBridge 302 it can be directed to RBridge 102 as directed by the IS-IS routing protocol.

When RBridge 102 receives the encapsulated frame, RBridge 102 may recognize from the egress RBridge address in the frame's header that the encapsulated packet is intended for virtual RBridge 302. RBridge 102 may also determine from its link state database that it neighbors virtual RBridge 302. Additionally, RBridge 102 may recognize that virtual RBridge 302 is not an actual RBridge and that virtual RBridge 302 cannot actually receive and forward packets. In response to this recognition, RBridge 102 may decapsulate the frame and then forward the packet to node 122 over the physical communications channel between node 122 and RBridge 102. Thus, to the rest of the RBridges in the network, it is as if RBridge 102 forwarded the frame to virtual RBridge 302 though a transmission path (virtual connection 304A), virtual RBridge 302 decapsulated the frame, and then forwarded the packet to the specific MAC address at node 122 over a transmission path (virtual connection 306A). In this way, RBridge 102 may provide virtual RBridge 302.

Many embodiments of the information handling system as depicted in FIG. 3 may allow virtual RBridge 302 to provide a single MAC address to reach more than one node. Network 300 also includes RBridge 106, which is connected to node 126. Like node 122, node 126 may provide a plurality of services, some or all of the services may be the same as those provided by node 122. Node 126 may provide the same specific service mentioned above in connection with node 122. When nodes 126 and 122 both provide the same specific service, they may both use the same specific MAC address.

RBridge 106 may accomplish this association in the same way as RBridge 102 described above. In its link state database, RBridge 106 may indicate that RBridge 106 and virtual RBridge 302 are neighbors. RBridge 106 may create a link state packet that reflects that RBridge 106 and virtual RBridge 302 are neighbors. RBridge 106 may also create a MAC address resolution table that includes the connection of virtual RBridge 302 and the specific MAC address. RBridge 106 may transmit this link state packet throughout the network. And the virtual RBridge-MAC address connection or "binding" may propagate into MAC address resolution tables as the packet moves through the network. Therefore, all link state databases in the network may reflect that both RBridge 102 and RBridge 106 are neighbors of virtual RBridge 302, and all MAC address resolution tables was reflect the virtual RBridge 302-specific MAC address binding. By ensuring distributing this information to the RBridges in the network, the network will behave as if the service associated with the specific MAC address is located behind virtual RBridge 302.

RBridge 106 may function analogously to RBridge 102 with respect to the specific MAC address. Thus, when node 126 transmits a packet to RBridge 106 with the specific MAC address as its source address, RBridge 106 may encapsulate the packet in a TRILL frame with the virtual RBridge identifier for virtual RBridge 302 as its ingress RBridge address. When RBridge 106 forwards the packet to an egress RBridge address on behalf of virtual RBridge 302, RBridge 106 may direct the packet to a single egress RBridge or flood it based on whether the MAC destination address of the packet is a unicast or a flooding MAC.

When RBridge 106 receives a frame with the specific virtual RBridge as the egress RBridge address and the specified MAC address as its destination address, RBridge 106 may determine that RBridge 106 and virtual RBridge 302 are neighbors by using its link state database, and that the specific MAC address is associated with virtual RBridge 302 by using its MAC address resolution table. RBridge 106 will then decapsulate the frame and forward the packet to node 126, which is addressed by the specific MAC address. In this manner, a packet with the specific MAC address may be directed to one of many potential egress RBridges. This may allow the specific MAC address to be an anycast MAC address.

When, as above, the information handling system of network 300 includes multiple nodes providing the service associated with the specific MAC address, routing packets through the TRILL network may become more complicated. For example, when RBridge 104 receives a unicast packet with the specific MAC address as its destination address, RBridge 104 determines that both RBridge 102 and RBridge 104 neighbor virtual RBridge 302 by using information regarding the network topology in the link state database. If RBridge 104 determines that virtual RBridge 302 is closer in the network topology, or presents a lower network "cost", through RBridge 102 than through RBridge 106, RBridge 104 may forward the frame to RBridge 102 after encapsulating it with a TRILL header. Likewise, if RBridge 104 determines that virtual RBridge 302 is closer through RBridge 106 than through RBridge 102, RBridge 104 forwards the frame to RBridge 106 after encapsulation.

As depicted in FIG. 3, the path from RBridge 104 to virtual RBridge 302 is equidistant through RBridges 102 and 106. When the path to a virtual RBridge is equidistant through neighboring RBridges, the forwarding RBridge may determine which path to take based on load balancing (flow-based hashing) considerations or a standard unicast TRILL multipathing mechanism.

Figure 4:
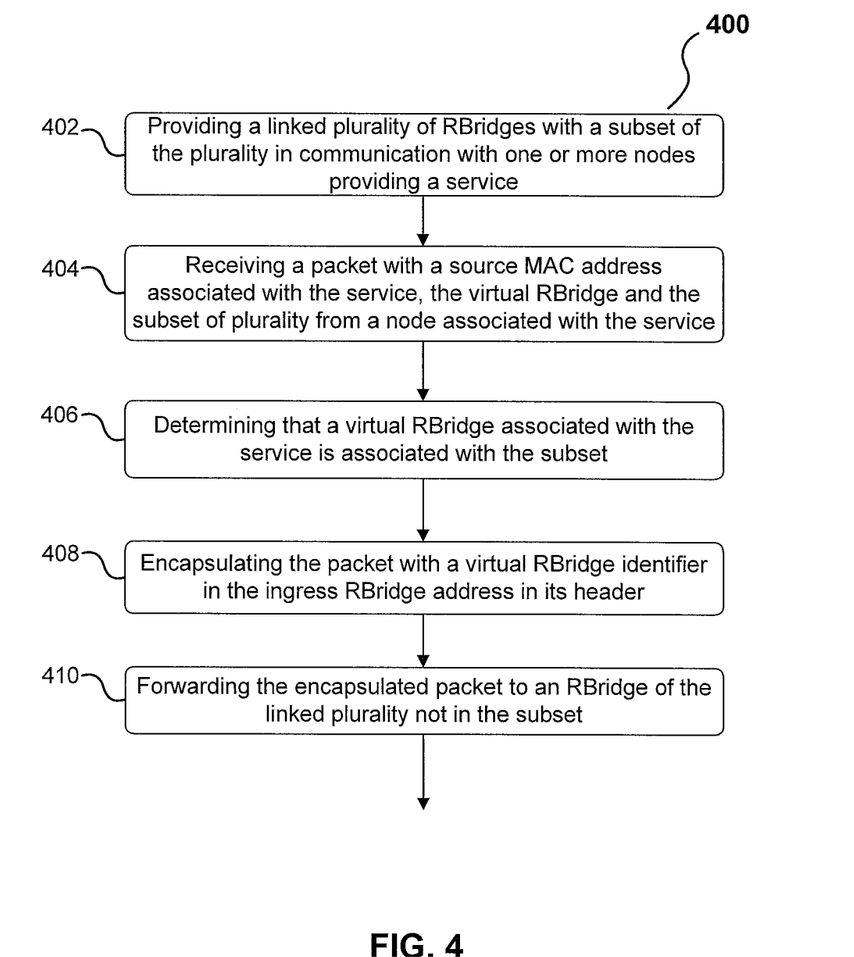
FIG. 4 is a flowchart of a method for ingressing packets from an anycast MAC addressed service into a network.

FIG. 4 is a flowchart of a method 400 for providing an anycast MAC address in a TRILL network. Method 400 may operate on a system such as that depicted in FIG. 1 to provide a system such as that of FIG. 3. Method 400 may begin in step 402 with the provision of a linked plurality of RBridges comprising a TRILL network. A subset of the plurality may be in communication with one or more nodes providing a service. Method 400 may continue in step 404 when an RBridge of the subset receives a packet from a node associated with the service. The node may have a source MAC address that is associated with the service. In step 406, the network may determine that a virtual RBridge associated with the service is associated with the RBridge subset. In step 408, the RBridge may encapsulate the packet into a TRILL frame with a TRILL header using an identifier of the virtual RBridge as the ingress RBridge address. Method 400 may terminate when the RBridge forwards the encapsulated packet to another RBridge, in step 410.

Using the information handling system of FIG. 1, method 400 may be applied to provide the information handling system of FIG. 3 as follows. Network 100 includes a plurality of RBridges. Of the plurality only RBridges 102 and 106 are in communication with nodes 122 and 126, both nodes providing a service (step 402). One of RBridges 102 and 106 may receive a packet from node 122 or 126 associated with the service. For clarity of description, RBridge 102 will be used as an example, but the substitution of RBridge 106 for RBridge 102 would be equally applicable.

RBridge 102 may determine that the packet has a source MAC address associated with the service (step 404). This may be done by configuration. RBridge 102 may determine that the source MAC address is associated with virtual RBridge 302 (step 406). Again, this may be accomplished by querying MAC address resolution table which may indicate the association. RBridge 102 may encapsulate the packet received from node 122 in a TRILL frame, including a virtual RBridge identifier for virtual RBridge 302 as the ingress RBridge address in the TRILL frame's header (step 408). RBridge 102 may determine the egress RBridge from the destination MAC address of the packet and forward the frame on to that egress RBridge (step 410).

Figure 5:
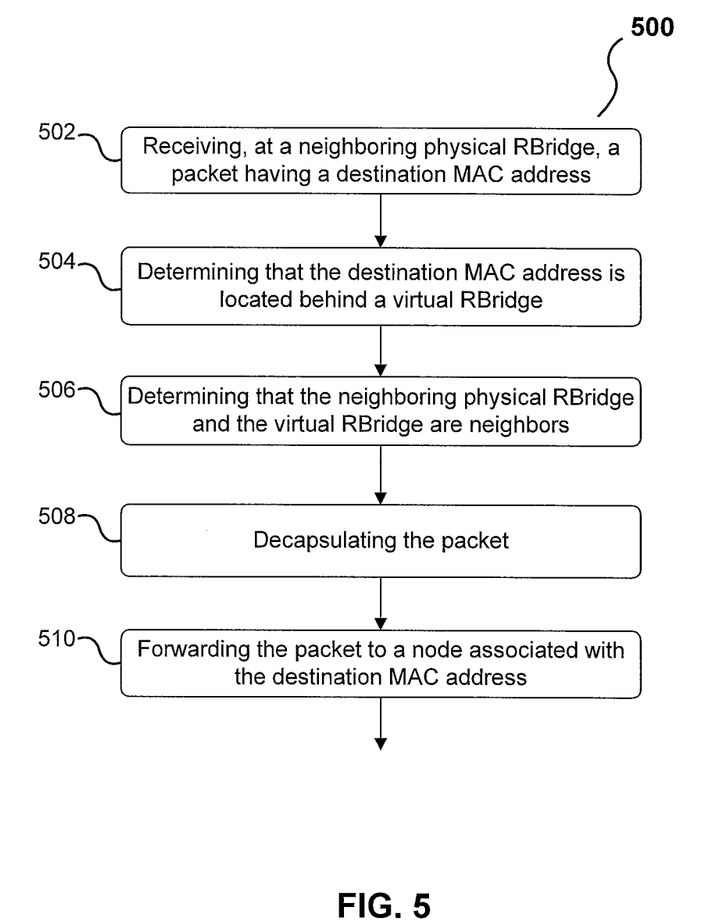
FIG. 5 is a flowchart of a method for egressing packets to an anycast MAC addressed service from a network.

FIG. 5 is a flowchart of a method 500 for providing an anycast MAC address in a TRILL network. In addition to receiving outgoing packets on behalf of a virtual RBridge, neighboring physical RBridges may receive incoming packets sent to the virtual RBridge by non-neighboring RBridges on the edges of the network. A packet entering the network may be sent to any of the nodes using the anycast MAC address by being directed to the virtual RBridge associated with the anycast MAC address. The ingress RBridge may use the MAC address resolution protocol to determine that the MAC address is located behind the virtual RBridge, and then route the packet to the virtual RBridge. In routing the packet to the virtual RBridge, the packet will actually be routed to the closest physical RBridge that is configured to function on behalf of the virtual RBridge.

Method 500 may begin in step 502, when an RBridge that is neighboring a virtual RBridge receives a frame having the virtual RBridge, that is logically situated behind the RBridge, as its egress RBridge and a destination MAC address. In step 504, the neighboring RBridge may determine that it neighbors the virtual RBridge. In step 506, the neighboring RBridge may determine that the destination MAC address is located behind the virtual RBridge. The RBridge may then decapsulate the frame by removing an outer header and a TRILL header, in step 508. Method 510 may end in step 500 when the RBridge forwards the packet to a node associated with the destination MAC address.

Method 500 may be performed on a system such as that of FIG. 1 to create a system such as that of FIG. 3. RBridge 102 may receive a frame that ingressed into the network via RBridge 104. The frame may contain a destination MAC address associated with a service (step 502). RBridge 102 may determine that it neighbors virtual RBridge 302 (step 504). Within RBridge 102, forwarding-decision module 208 may determine, by querying link state database 210, that the destination MAC address is located behind virtual RBridge 302 (step 506). RBridge 102 may recognize that the virtual RBridge 302 is not a physical RBridge. RBridge 102 may then decapsulate the frame (step 508) and forward the packet to node 122 (step 510), which MAC address resolution table 212 associates with the destination MAC address. In some embodiments, the frame may be routed to RBridge 106, which would then behave exactly as RBridge 102 is described above. In such a case, the decapsulated packet would then be sent to node 126.

Many variations fall within the scope of this disclosure. For instance, some embodiments may include more than two RBridges neighboring a single virtual RBridge. Additionally, some embodiments may include more than one virtual RBridge for more than one anycast MAC addressed service, with one anycast MAC address served by one virtual RBridge.

Both methods 400 and 500 may be thought of as directed to ingressing and egressing activity. Routing through the core of the TRILL network may be directed by the IS-IS protocol substantially as done in traditional TRILL networks that do not provide anycast MAC addressing. To facilitate operation in the overall network, when virtual RBridges such as virtual RBridge 302 are created, the link state databases may indicate that virtual RBridge 302 has a very high cost metric and/or that the overload bit for virtual RBridge 302 is set. Thus, the topology of the network contained in the link state databases will discourage any attempt to route frames through any virtual RBridges. For example, in the information handling system of FIG. 3 a frame that ingresses at RBridge 106 with RBridge 102 as its egress RBridge will not be routed through virtual RBridge 302. Rather, the frame may be routed through RBridges 114 or 116.

Many advantages may be obtained by implementing anycast MAC addressing as described herein. By implementing anycast MAC addressing as depicted in FIG. 3, the anycast MAC addressed service provided by nodes 122 and 126 may gain added resilience when either node fails. For example, a packet ingressing at RBridge 104 with the anycast MAC address as its destination MAC address will be routed to virtual RBridge 302 since it is associated with the anycast MAC address. Depending on loads on the network, the encapsulated packet may be routed to virtual RBridge 302 through either RBridge 102 or RBridge 106. If node 126 fails, the failure may be detected as link state packets are exchanged according to the IS-IS protocol, causing all the link state packets of the RBridges in network 300 to reflect that RBridge 106 no longer neighbors virtual RBridge 302. Thereafter, rather than routing ingressing packets that include the anycast MAC address to either RBridge 102 or RBridge 106, all such packets may be routed to 102 as it is the only RBridge that neighbors virtual RBridge 302 in the network. In this way, the service provided by nodes 122 and 126 can continue to be hosted by 122 without changing the routing mechanism.

These benefits may be more apparent in embodiments in which the virtual RBridge is used to provide an anycast MAC address for a service operating on three or more nodes. In an embodiment with an anycast MAC addressable service operating on four nodes, if one node fails the service may continue to be provided by the three remaining nodes without changing the routing mechanism through the core of network 300. By updating link state packets through the network those packets that would have been forwarded to the failed node may be simply routed to one of the other three nodes. This may be done by continuing the forward such packets to the virtual RBridge associated with the anycast MAC address.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system, comprising:
a first node that provides a first service that is associated with a service-specific Media Access Control (MAC) address that is specific to the first service;
a first physical bridging device that is connected to the first node and coupled to a network;
a second node that provides the first service that is associated with the service-specific MAC address that is specific to the first service;
a second physical bridging device that is connected to the second node and coupled to the network;
a third physical bridging device that is coupled to the first physical bridging device and the second physical bridging device; and
a virtual bridging device that is associated with a virtual bridging device identifier and that is provided by the first physical bridging device and the second physical bridging device such that the virtual bridging device identifier is an ingress address for packets originating from the first node and the second node;
wherein the first physical bridging device is configured to:
receive a first packet from the first node that includes the service-specific MAC address that is specific to the first service as a source address and, in response, encapsulate the first packet with the virtual bridging device identifier as the ingress address to provide an encapsulated first packet, and forward the encapsulated first packet through the network;
wherein the second physical bridging device is configured to:
receive a second packet from the second node that includes the service-specific MAC address that is specific to the first service as a source address and, in response, encapsulate the second packet with the virtual bridging device identifier as the ingress address to provide an encapsulated second packet, and forward the encapsulated second packet through the network; and
wherein the third physical bridging device is configured to:
receive an encapsulated third packet with the virtual bridging device identifier as an egress address;
determine whether the second node has failed and, in response to determining that the second node has failed, forward the encapsulated third packet to the first physical bridging device such that the first physical bridging device decapsulates the encapsulated third packet to provide a decapsulated third packet and forwards the decapsulated third packet to the first node.

2. The information handling system of claim 1, wherein the third physical bridging device is configured to:
forward, in response to determining that the second node has not failed, the encapsulated third packet to the second physical bridging device; and
wherein the second physical bridging device is configured to:
decapsulate, in response to receiving the encapsulated third packet, the encapsulated third packet to provide a decapsulated third packet; and
forward the decapsulated third packet to the second node.

3. The information handling system of claim 2, wherein the third physical bridging device is configured to:
receive the encapsulated third packet with the virtual bridging device identifier as an egress address; and
determine that the first node has failed and, in response, forward the encapsulated third packet to the second physical bridging device.

4. The information handling system of claim 1, further comprising:
a third node that provides the first service that is associated with the service-specific MAC address that is specific to the first service; and
a fourth physical bridging device that is connected to the third node and coupled to the network, wherein the virtual bridging device is provided by the first physical bridging device, the second physical bridging device, and the fourth physical bridging device;
wherein the fourth physical bridging device is configured to:
receive a fourth packet from the third node that includes the MAC address that is specific to the first service as a source address and, in response, encapsulate the fourth packet with the virtual bridging device identifier as the ingress address to provide an encapsulated fourth packet, and forward the encapsulated fourth packet through the network.

5. The information handling system of claim 1, wherein the third physical bridging device is configured to:
determine, in response to the determining that the second node has not failed, which of the first physical bridging device and the second physical bridging device is closest to the third physical bridging device; and
transmit the encapsulated third packet to the one of the first physical bridging device and the second physical bridging device that is closest to the third physical bridging device.

6. The information handling system of claim 1, wherein the third physical bridging device configured to:
perform, in response to the determining that the second node has not failed, a load balancing determination to determine whether to transmit the encapsulated third packet to the first physical bridging device or the second physical bridging device; and
transmit the encapsulated third packet according to the load balancing determination.

7. The information handling system of claim 1,
wherein the first physical bridging device is configured to:
create a first link state packet that indicates that the first physical bridging device provides the virtual bridging device; and
send the first link state packet over the network;
wherein the second physical bridging device is configured to:
create a second link state packet that indicates that the second physical bridging device provides the virtual bridging device; and
send the second link state packet over the network.

8. A method for forwarding packets through a network, the method comprising:
providing, by a first node and a second node, a first service that is associated with a service-specific Media Access Control (MAC) address that is specific to the first service;
providing, by a first physical bridging device that is connected to the first node and by a second physical bridging device that is connected to the second node, a virtual bridging device that is associated with a virtual bridging device identifier such that the virtual bridging device identifier is an ingress address for packets originating from the first node and the second node;
receiving, by the first physical bridging device from the first node, a first packet that includes the service-specific MAC address that is specific to the first service as a source address and, in response, encapsulating the first packet with the virtual bridging device identifier as the ingress address to provide an encapsulated first packet, and forwarding the encapsulated first packet through a network; and
receiving, by the second physical bridging device from the second node, a second packet that includes the service-specific MAC address that is specific to the first service as a source address and, in response, encapsulating the second packet with the virtual bridging device identifier as the ingress address to provide an encapsulated second packet, and forwarding the encapsulated second packet through the network;
receiving, by a third physical bridging device that is coupled to the first physical bridging device and the second physical bridging device, an encapsulated third packet with the virtual bridging device identifier as an egress address;
determining, by the third physical bridging device, whether the second node has failed and, in response to determining that the second node has failed, forwarding the encapsulated third packet to the first physical bridging device; and
receiving, by the first physical bridging device, the encapsulated third packet and, in response, decapsulating the encapsulated third packet to provide a decapsulated third packet, and forwarding the decapsulated third packet to the first node.

9. The method of claim 8, further comprising:
determining, by the third physical bridging device in response to the determining that the second node has not failed, which of the first physical bridging device and the second physical bridging device is closest to the third physical bridging device; and
transmitting, by the third physical bridging device, the encapsulated third packet to the one of the first physical bridging device and the second physical bridging device that is closest to the third physical bridging device.

10. The method of claim 8, further comprising:
creating, by the first physical bridging device, a first link state packet that indicates that the first physical bridging device provides the virtual bridging device; and
sending, by the first physical bridging device, the first link state packet over the network;
creating, by the second physical bridging device, a second link state packet that indicates that the second physical bridging device provides the virtual bridging device; and
sending, by the second physical bridging device, the second link state packet over the network.

11. The method of claim 8, further comprising:
performing, by the third physical bridging device in response to the determining that the second node has not failed, a load balancing determination to determine whether to transmit the encapsulated third packet to the first physical bridging device or the second physical bridging device; and
transmitting, by the third physical bridging device, the encapsulated third packet according to the load balancing determination.

12. The method of claim 8, further comprising:
providing, by a third node, the first service that is associated with the service-specific Media Access Control (MAC) address that is specific to the first service;
providing, by a fourth physical bridging device that is connected to the third node, the virtual bridging device that is associated with the virtual bridging device identifier; and
receiving, by the fourth physical bridging device from the third node, a fourth packet that includes the service-specific MAC address that is specific to the first service as a source address and, in response, encapsulating the fourth packet with the virtual bridging device identifier as the ingress address to provide an encapsulated fourth packet, and forwarding the encapsulated fourth packet through the network.

13. The method of claim 8, wherein each of the first packet and the second packet are one of a unicast packet and a multicast packet.

14. A method for forwarding packets through a Transparent Interconnect of Lots of Links (TRILL) network, the method comprising:
providing, by a first node and a second node, a first service that is associated with a service-specific Media Access Control (MAC) address that is specific to the first service;
providing, by a first TRILL protocol bridge that is connected to the first node and by a second TRILL protocol bridge that is connected to the second node, a virtual TRILL protocol bridge that is associated with a virtual TRILL protocol bridge identifier such that the virtual TRILL bridge device identifier is an ingress TRILL protocol bridge address of packets originating from the first node and the second node;
receiving, by the first TRILL protocol bridge from the first node, a first packet that includes the service-specific MAC address that is specific to the first service as a source address and, in response, encapsulating the first packet with the virtual TRILL protocol bridge identifier as the ingress TRILL protocol bridge address to provide an encapsulated first packet, and forwarding the encapsulated first packet through a network; and
receiving, by the second TRILL protocol bridge from the second node, a second packet that includes the service-specific MAC address that is specific to the first service as a source address and, in response, encapsulating the second packet with the virtual TRILL protocol bridge identifier as the ingress TRILL protocol bridge address to provide an encapsulated second packet, and forwarding the encapsulated second packet through the network;
receiving, by a third TRILL protocol bridge that is coupled to the first TRILL protocol bridge and the second TRILL protocol bridge, an encapsulated third packet with the virtual TRILL protocol bridge identifier as an egress TRILL protocol bridge address;
determining, by the third TRILL protocol bridge, whether the second node has failed and, in response to determining that the second node has tailed, forwarding the encapsulated third packet to the first third TRILL protocol bridge; and
receiving, by the first TRILL protocol bridge, the encapsulated third packet and, in response, decapsulating the encapsulated third packet to provide a decapsulated third packet, and forwarding the decapsulated third packet to the first node.

15. The method of claim 14, further comprising:
creating, by the first TRILL protocol bridge, a first link state packet that indicates that the first TRILL protocol bridge provides the virtual TRILL protocol bridge; and
sending, by the first TRILL protocol bridge, the first link state packet over the network;
creating, by the second TRILL protocol bridge, a second link state packet that indicates that the second TRILL protocol bridge provides the virtual TRILL protocol bridge; and
sending, by the second TRILL protocol bridge, the second link state packet over the network.

16. The method of claim 14, further comprising:
performing, by the third TRILL protocol bridge in response to the determining that the second node has not failed, a load balancing determination to determine whether to transmit the encapsulated third packet to the first TRILL protocol bridge or the second TRILL protocol bridge; and
transmitting, by the third TRILL protocol bridge, the encapsulated third packet according to the load balancing determination.

17. The method of claim 14, further comprising:
determining, by the third TRILL protocol bridge in response to the determining that the second node has not failed, which of the first TRILL protocol bridge and the second TRILL protocol bridge is closest to the third TRILL protocol bridge; and
transmitting, by the third TRILL protocol bridge, the encapsulated third packet to the one of the first TRILL protocol bridge and the second TRILL protocol bridge that is closest to the third TRILL protocol bridge.

18. The method of claim 14, further comprising:
providing, by a third node, the first service that is associated with the service-specific Media Access Control (MAC) address that is specific to the first service;
providing, by a forth TRILL protocol bridge that is connected to the third node, the virtual TRILL protocol bridge that is associated with the virtual TRILL protocol bridge identifier; and
receiving, by the fourth TRILL protocol bridge from the third node, a fourth packet that includes the service-specific MAC address that is specific to the first service as a source address and, in response, encapsulating the fourth packet with the virtual TRILL protocol bridge identifier as the ingress TRILL protocol bridge address to provide an encapsulated fourth packet, and forwarding the encapsulated fourth packet through the network.

19. The method of claim 14, wherein each of the first packet and the second packet are one of a unicast packet and a multicast packet.

* * * * *